US010207839B2

(12) United States Patent
Hearing et al.

(10) Patent No.: US 10,207,839 B2
(45) Date of Patent: Feb. 19, 2019

(54) FLEXIBLE CONFIGURATION SYSTEM, METHODS, EQUIPMENT, AND AIRCRAFT

(71) Applicant: THE BOEING COMPANY, Chicago, IL (US)

(72) Inventors: John D. Hearing, Maple Valley, WA (US); Edward A. Froese, Tacoma, WA (US); Charlotte R. Lin, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/948,846

(22) Filed: Apr. 9, 2018

(65) Prior Publication Data

US 2018/0222632 A1 Aug. 9, 2018

Related U.S. Application Data

(62) Division of application No. 11/609,644, filed on Dec. 12, 2006, now Pat. No. 9,950,833.

(51) Int. Cl.
*B65D 19/38* (2006.01)
*B64D 9/00* (2006.01)

(52) U.S. Cl.
CPC ............ *B65D 19/38* (2013.01); *B64D 9/00* (2013.01); *B65D 2519/00333* (2013.01)

(58) Field of Classification Search
CPC . B65D 19/38; B65D 2519/00333; B64D 9/00
See application file for complete search history.

(56) References Cited

U.S. PATENT DOCUMENTS

| 3,727,581 | A | * | 4/1973 | Brent | A01K 1/0236 |
| | | | | | 119/453 |
| 4,835,604 | A | * | 5/1989 | Kondo | H04N 7/10 |
| | | | | | 348/836 |
| 4,853,555 | A | | 8/1989 | Wheat | |
| 5,984,415 | A | | 11/1999 | Schumacher et al. | |
| 6,038,426 | A | | 3/2000 | Williams, Jr. | |
| 6,056,239 | A | * | 5/2000 | Cantu | B64D 11/06 |
| | | | | | 244/118.5 |
| 6,808,413 | B2 | | 10/2004 | Plant et al. | |
| 6,899,390 | B2 | * | 5/2005 | Sanfrod | B64D 11/06 |
| | | | | | 297/217.4 |
| 6,929,218 | B1 | | 8/2005 | Sanford et al. | |
| 7,063,562 | B2 | * | 6/2006 | Henley | B64C 1/18 |
| | | | | | 439/34 |
| 2005/0021602 | A1 | | 1/2005 | Noel et al. | |
| 2006/0038070 | A1 | | 2/2006 | Henley et al. | |
| 2008/0135681 | A1 | * | 6/2008 | Hearing | B64D 9/00 |
| | | | | | 244/118.1 |

(Continued)

*Primary Examiner* — Valentina Xavier
(74) *Attorney, Agent, or Firm* — Toler Law Group, P.C.

(57) ABSTRACT

A flexible configuration system, method equipment and aircraft are disclosed. This system may use a pallet that includes a load bearing member; and a pallet data network system carried by the load bearing member. The data network system includes at least one external data connection configured to connect the pallet data network to an external network; and at least one pallet data connection configured to connect the pallet data network to devices, equipment, workstations, or seats carried by the pallet.

20 Claims, 5 Drawing Sheets

(56) References Cited

U.S. PATENT DOCUMENTS

| | | | |
|---|---|---|---|
| 2009/0092471 A1* | 4/2009 | Krantz | B64C 1/20 414/373 |
| 2011/0313563 A1* | 12/2011 | Huber | B64D 9/00 700/214 |
| 2016/0194081 A1* | 7/2016 | Himmelmann | B64D 9/00 414/509 |
| 2018/0236278 A1* | 8/2018 | Smith | A62C 2/04 |

* cited by examiner

FLEXIBLE CONFIGURATION SYSTEM, METHODS, EQUIPMENT, AND AIRCRAFT

PRIORITY CLAIM

This application claims priority from, and is a divisional application of, U.S. patent application Ser. No. 11/609,644, filed on Dec. 12, 2006, which is incorporated herein by reference in its entirety.

BACKGROUND OF THE INVENTION

Field of the Invention

The invention relates to methods, equipment and systems used to reconfigure or repurpose aircraft and, more particularly, to methods, equipment and systems used to quickly reconfigure or repurpose an aircraft without an extended out of service period.

Description of the Related Art

Reconfiguration of commercial or military aircraft is challenging, particularly when installation of new equipment, capabilities, or changes in mission is required. Military aircraft may need to be reconfigured when the needs of intelligence, surveillance, or command and control missions change. Civilian aircraft may require reconfiguration to account for changing passenger demographics, fare classifications, or seating arrangements.

Current military configurations involve bolted-down racks of equipment, secured workstations, dedicated wiring bundles, etc. Making changes to these often require substantial levels of effort, including designing new racks, rewiring systems, upgrading cooling, cutting new holes in aircraft, and reshuffling equipment in order to maintain weight and balance.

Military aircraft reconfiguration has other impacts as well. When new capabilities are needed, many times they are developed in systems labs, then the aircraft must be taken out of service, the upgrades installed, and then substantial testing must take place.

Rapid changeover of mission systems has been a goal for years, especially concepts for rolling mission systems on or off aircraft, but reality has been harder to achieve, as most wiring, cooling, etc. has not been set up to accommodate these rapid changes.

Attempts have been made to provide rapid changeover capabilities using cargo containers and/or standard air cargo pallets. These were generally wired inside, but didn't offer any network or power distribution advantages and have generally not been successful due to the weight penalty imposed by using these types of cargo-rated systems.

Current civilian configurations involve bolted down seats, fixed overhead lighting, EC, and emergency equipment, dedicated wiring bundles to connect to the overhead and seat audio/visual systems and EC systems; etc. Making changes to these often require substantial levels of effort, i.e., rewiring systems, upgrading cooling, moving lighting, EC and emergency equipment.

Civilian aircraft reconfiguration has other impacts as well. When a new seat arrangement or audio/video upgrades are needed, the aircraft must be taken out of service for an extended time, the upgrades installed, and then substantial testing must take place. This time period represents lost revenue for the airline.

Rapid reconfiguration of civilian aircraft has been considered impractical for years. Consequently, no real effort has been made to develop modular systems for civilian aircraft.

Accordingly, there is a need for a generic pallet, floor panel system, or method that provides at least network connections on the pallet and can be used for to reconfigure aircraft.

BRIEF SUMMARY OF THE INVENTION

The present invention addresses the problems identified above by providing methods, equipment and systems that enable the reconfiguration of an aircraft.

Methods, aircraft, systems and pallets are disclosed for configuring Intelligence, Surveillance, or Command and Control or similar aircraft with mission systems, workstations, and processing equipment through installing all mission systems, workstations, processors, etc. on modular, lightweight "pallets" that can fit on main deck or in cargo bays of aircraft; network, electrical power, and environmental conditioning (EC) provisions integrated into the pallets; a related distributed system of network, electrical power, and environmental conditioning, equipped with standardized connection mechanisms at multiple locations, accessible from main deck and/or cargo bay of aircraft.

Aircraft mission systems are disclosed that can be rapidly reconfigured, replaced, and recapitalized. Thus, allowing systems to be rapidly installed after lab checkout, reducing "downtime" for aircraft being upgraded. It also enables flexible configurations for specific missions—ability to add workstations or processors, or shift to different locations, depending on weight, balance, or range requirements; ability to offload systems that aren't in use, thereby extending aircraft range by not requiring them to carry unnecessary weight.

One embodiment of the invention may provide a significant improvement in techniques for configuring Intelligence, Surveillance, Reconnaissance, Command and Control or similar aircraft with mission systems, workstations, and processing equipment. Another embodiment of the invention utilizes "palletized" standardized, distributed system for equipping aircraft with mission systems.

One embodiment includes a smart pallet formed from a load bearing member; and a pallet data network system carried by the load bearing member. The data network system includes at least one external data connection configured to connect the pallet data network to an external network; and at least one pallet data connection configured to connect the pallet data network to devices, equipment, workstations, or seats carried by the pallet.

Another embodiment includes an airplane having an airframe; an airplane network carried by the airframe, the airplane network having a plurality of predetermined connection points; and at least one pallet removably carried by the airframe. The pallet includes a first load bearing member; and a pallet data network system carried by the load bearing member. The data network system includes at least one external data connection that connects the pallet data network to the airplane network; and at least one pallet data connection configured to connect the pallet data network to devices, equipment, workstations, or seats carried by the pallet.

BRIEF DESCRIPTION OF THE DRAWINGS

The accompanying drawings incorporated in and forming part of the specification illustrate several aspects of the present invention. In the drawings.

Reference will now be made in detail to embodiments of the invention, examples of which are illustrated in the accompanying drawings.

DETAILED DESCRIPTION

Figure 1:
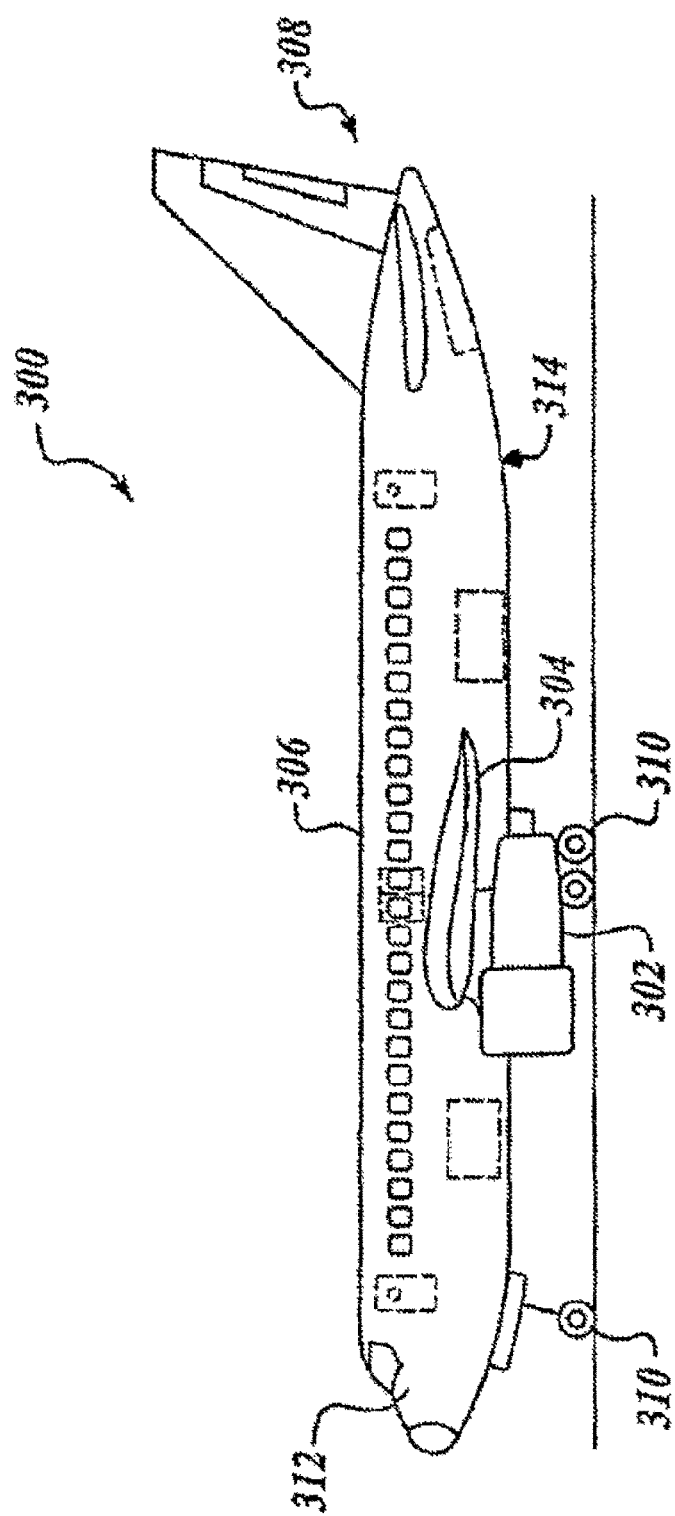
FIG. 1 illustrates a side view of an aircraft that may include one embodiment of the invention.

Those skilled in the art will also readily recognize that the following embodiments may be incorporated into a wide variety of different systems. Referring now in particular to FIG. 1, a side elevation view of an aircraft 300 having one or more of the disclosed embodiments of the present invention is shown. With the exception of the embodiments according to the present invention, the aircraft 300 includes components and subsystems generally known in the pertinent art, and in the interest of brevity, will not be described further. The aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. In some embodiments the fuselage 306, tail assembly 308 and nose assembly 312 may form an airframe 314. In other embodiments the airframe may also include wings 304.

The aircraft 300 further includes other systems and subsystems generally required for the proper operation of the aircraft 300. For example, the aircraft 300 includes a flight control system (not shown in FIG. 1), as well as a plurality of other network, electrical, EC, mechanical and electromechanical systems that cooperatively perform a variety of tasks necessary for the operation of the aircraft 300. Accordingly, the aircraft 300 is generally representative of a commercial passenger aircraft, which may include, for example, the 737, 747, 757, 767 and 777 commercial passenger aircraft available from The Boeing Company of Chicago, Ill. Although the aircraft 300 shown in FIG. 1 generally shows a commercial passenger aircraft, it is understood that the various embodiments of the present invention may also be incorporated into flight vehicles of other types. Examples of such flight vehicles may include manned or even unmanned military aircraft, rotary wing aircraft, ballistic flight vehicles or orbital vehicles, as illustrated more fully in various descriptive volumes, such as Jane's All The World's Aircraft, available from Jane's Information Group, Ltd. of Coulsdon, Surrey, UK. Additionally, those skilled in the art will readily recognize that the various embodiments of the present invention may also be incorporated into terrestrial or even marine vehicles.

Figure 2:
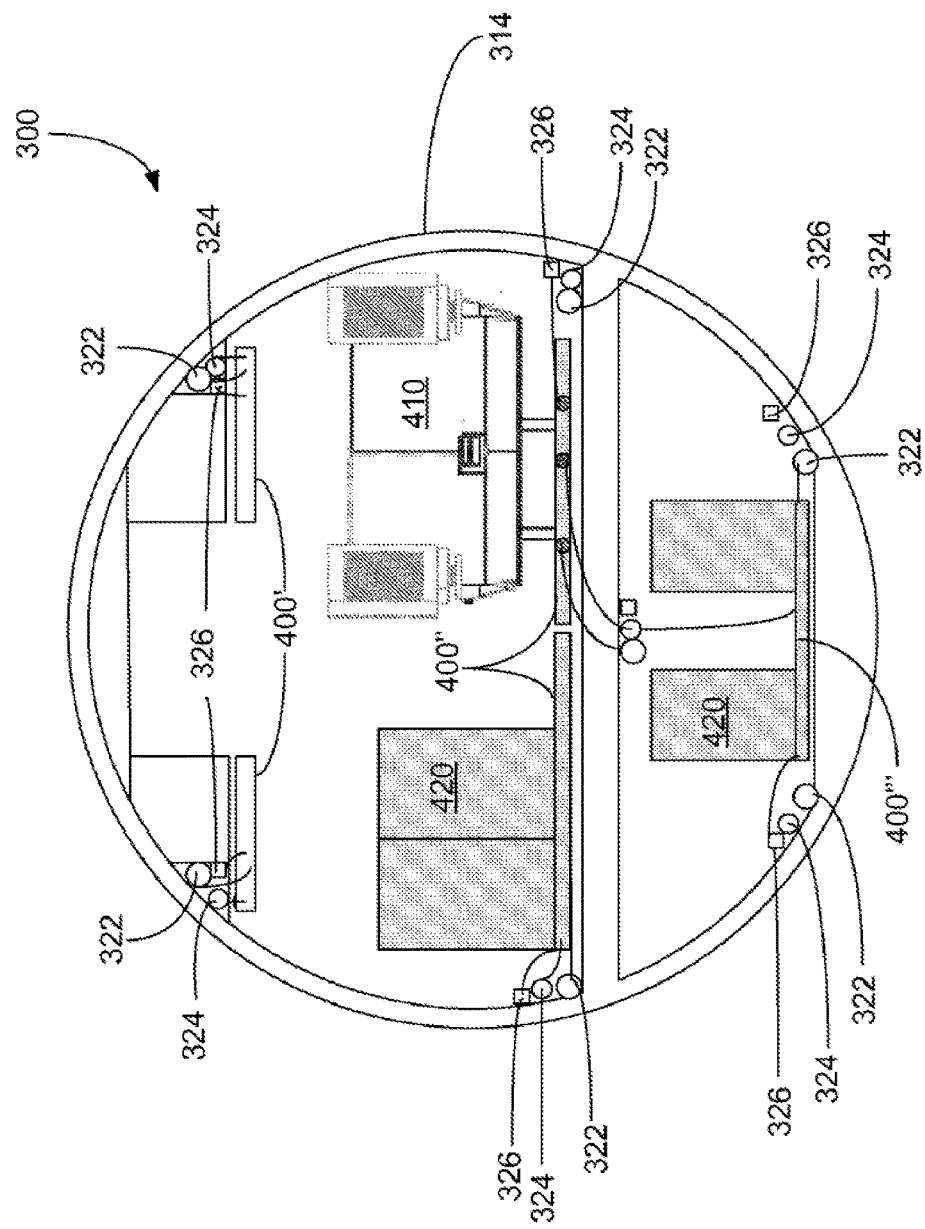
FIG. 2 illustrates an exemplary cross-section of the aircraft shown in FIG. 1 and illustrating different embodiments of the invention.

As shown in the exemplary aircraft cross section in FIG. 2, the aircraft 300 may include one or more of the embodiments of the pallet assembly, which may be incorporated into various portions of the aircraft 300.

As shown in FIG. 2, aircraft 300 may include one or more environmental conditioning (EC) systems 322; one or more power systems 324, and one or more network systems 326.

The EC system 322 may be any current or future EC system and may include HVAC, liquid heating, and/or liquid cooling systems. Similarly, the power system 324 and network system 326 may be any current or future systems. Typically, power system 324 carries electric power. These systems may be located at different locations depending on the needs of the aircraft 300 builder or owner. For example, the systems may be run together as shown in FIG. 2. In other embodiments the systems may be separated. The systems may be installed in the overhead of the main cabin or the cargo hold. Alternatively, these systems may be installed at or near the floor of the main cabin or the cargo hold.

Each of the EC system 322, power system 324, and network system 326 has connection points at predetermined positions. In one embodiment the connection points are approximately the same distance apart. In other embodiments the distance between connections may vary.

FIG. 2 also shows different embodiments for pallet 400. For example overhead pallet 400' may be removably carried by the airframe 314 in the overhead of the main cabin. In some embodiments the overhead pallet 400' may be removably attached to the overhead bins or the supports for the overhead bins. The overhead pallet 400' may connect to one or more of the EC system 322, power system 324, or network system 326.

Main cabin pallet 400" may be removably carried by the main cabin floor or floor structure. Thus, in some embodiments, the pallet 400" could replace the conventional floor plates or deck and be removably attached to the main cabin floor beams or floor structure. The main cabin pallet 400" may connect to one or more of the EC system 322, power system 324, or network system 326.

Similarly, cargo hold pallet 400''' may be removably carried by the cargo hold floor or floor structure. Thus, in some embodiments, the pallet 400''' could replace the conventional floor plates or deck and be removably attached to the cargo hold floor beams or floor structure. The cargo hold pallet 400''' may connect to one or more of the EC system 322, power system 324, or network system 326. In some embodiments the cargo hold pallet 400''' may be the same as the main cabin pallet 400".

The pallet 400 is typically, attached or fastened to the airframe or supporting structure in any manner that will permit the easy removal and replacement of the pallet. For example, pallet 400 may be attached using screws, ¼ turn twist to lock fasteners, etc. Pallet 400 could also be attached to an existing fitting in the aircraft such as longitudinal "seat rails" or cargo attachment systems.

Figure 3:
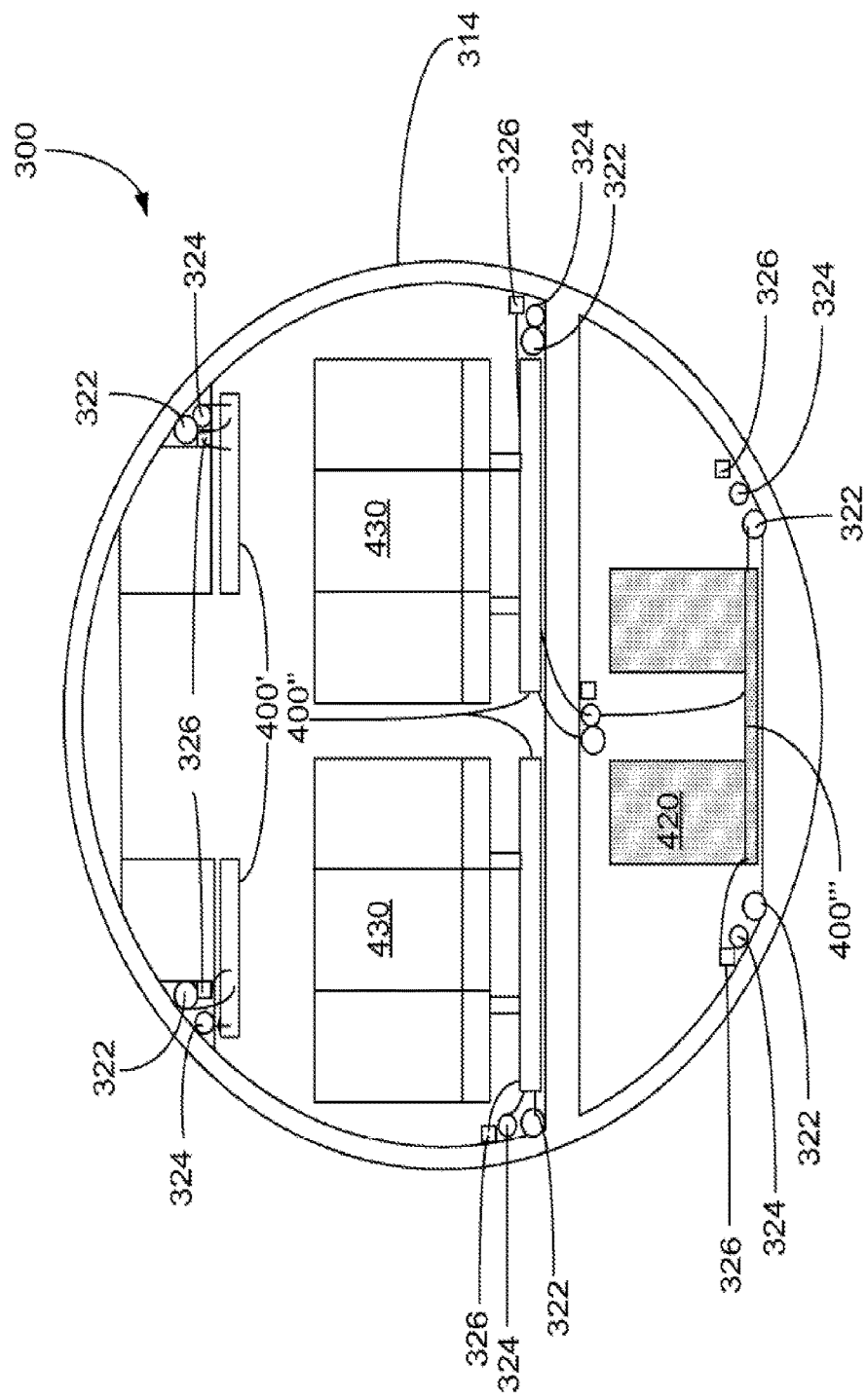
FIG. 3 shows an exemplary cross-section of the aircraft shown in FIG. 1 and illustrating different embodiments of the invention.

FIG. 2 illustrates main cabin pallet 400" carrying a workstation 410 or equipment 420. Cargo hold pallet 400''' is illustrated carrying equipment 420. The illustrated overhead pallet 400' may carry lighting, ventilation outlets, speakers, video displays, emergency equipment, etc. A drop down oxygen mask is one example of emergency equipment that may be carried by overhead pallet 400'. FIG. 3 illustrates main cabin pallet 400" carrying passenger seats.

Figure 4:
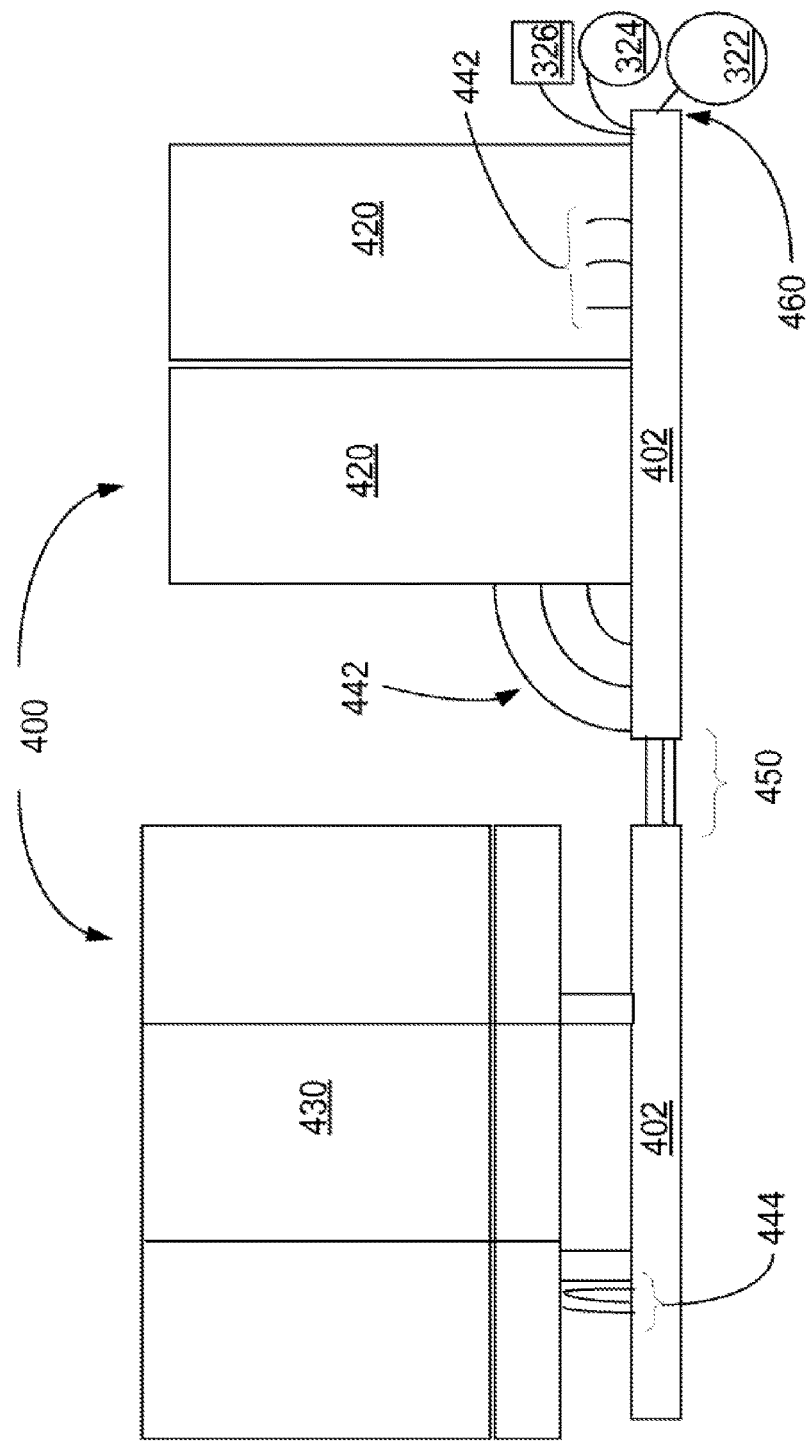
FIG. 4 illustrates additional embodiments of the invention.

FIG. 4 illustrates an embodiment where one pallet 400 carries equipment 420 and a second pallet 400 carries seats 430. The seats 430 may be connected to the pallet 400 with seat supports. Typically, the seat supports would connect to seat rails on the pallet 400. If desired the seats 430, equipment 420 and/or work station 410 may also be connected to one or more of a pallet EC system, a pallet power system, or a pallet data network. In the embodiment shown in FIG. 4, equipment 420 may be connected to one or more of the pallet EC system, the pallet power system, or the pallet data network with connections 442. Typically the equipment 420 would only connect to the systems on pallet 400 used by equipment 420.

In the embodiment shown in FIG. 4, seats 430 may be connected to one or more of the pallet EC system, the pallet power system, or the pallet data network with connections 444. Typically the seats would only connect to the systems on pallet 400 used by seats 430. In the typical embodiment the seats 430 would receive audio and/or video programming over the pallet network and receive power for the audio and/or video system from the pallet power system. In some embodiments the seats 430 may receive warm or cool air from the pallet EC system. The seats 430 are shown as a group of three seats. In other embodiments the number of seats could be larger or smaller. In some embodiments there may be a single seat on pallet 400.

Pallet 400 may connect to the aircraft EC system 322, the aircraft power system 324, or the aircraft network 326 with connections 460. In some embodiments the pallet 400 may only connect to the systems required to support the seats 430, equipment 420, or workstation 410 carried by the pallet 400. In other embodiments, the pallet may connect to all or a common subset of the systems available so that a pallet 400 may share its connection 460 to the aircraft systems with another pallet 400 using a pallet to pallet connection 450. In some embodiments a dedicated connection may be used. In other embodiments the pallet to pallet connection would connect the pallet to aircraft connection, on the pallet to receive system support, to a pallet to equipment connection on the pallet providing system support. The use of a pallet to pallet connection 450 could reduce the number of aircraft system connections required.

In some embodiments on the pallets 400 may be lightweight pallets made of honeycombed composite materials or other lightweight structures. The pallets may include network, power and EC systems and connections. Additional system connections may also be provided. The pallets may also include mission consoles, mission processing systems, seating, overhead lighting and ventilation and/or combinations of elements.

Each pallet 400 typically has standardized connections and distribution built in for network, power, and EC (e.g. cooling air). The aircraft may be configured to accept these pallets on the main deck and/or in the lower cargo bays interchangeably. In the deck between the upper and lower decks may be conduits that carry electrical power, network cables, and EC such as cooling along the length of the aircraft, accessible from main deck and/or cargo bay of aircraft. Periodic standardized connection points for power, network, and cooling are available at regular intervals along the aircraft, so that pallets can be easily plugged into them.

Figure 5:
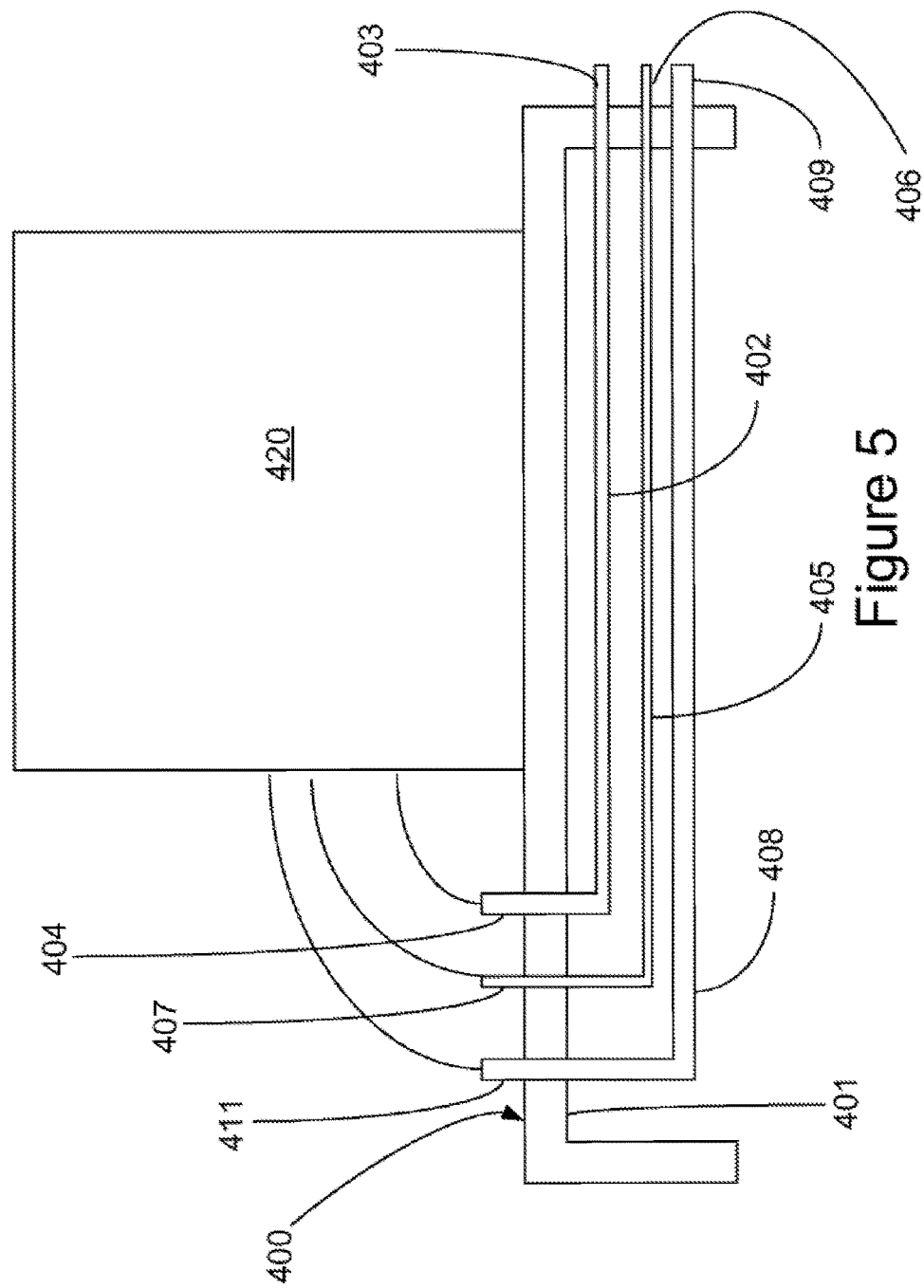
FIG. 5 shows a close-up view of one of the embodiments shown in FIG. 4.

FIG. 5 illustrates one embodiment of pallet 400. In this embodiment, pallet 400 may be formed from a load bearing member 401. Attached to or carried by load bearing member 401 are the pallet systems. In the embodiment shown these systems include pallet EC system 402; pallet power system 405; and pallet network system 408. Other embodiments may have additional systems or may have only one or two of these systems.

The pallet EC system 402 includes at least one pallet-aircraft connection 403 which is configured to connect the pallet EC system 402 to the aircraft EC system 322. The pallet EC system 402 also includes at least one pallet-equipment connection 404 which is configured to connect the pallet EC system 402 to the equipment, workstation, seat, etc. carried by the pallet.

The pallet power system 405 includes at least one pallet-aircraft connection 406 which is configured to connect the pallet power system 405 to the aircraft power system 324. The pallet power system 405 also includes at least one pallet-equipment connection 407 which is configured to connect the pallet power system 405 to the equipment, workstation, seat, etc. carried by the pallet.

The pallet network system 408 includes at least one pallet-aircraft connection 409 which is configured to connect the pallet network system 408 to the aircraft network system 326. The pallet network system 408 also includes at least one pallet-equipment connection 411 which is configured to connect the pallet network system 408 to the equipment, workstation, seat, etc. carried by the pallet.

The pallet-aircraft connections and the pallet-equipment connections may use any suitable connector.

In summary, numerous benefits are described which result from employing the concepts of the invention. The foregoing description of an exemplary preferred embodiment of the invention is presented for the purposes of illustration and description. It is not intended to be exhaustive or to limit the invention to the precise form disclosed. Obvious modifications or variations are possible in light of the above teachings. The embodiment was selected and described in order to best illustrate the principles of the invention and its practical application to thereby enable one of ordinary skill in the art to best utilize the invention in various embodiments and with various modifications as are suited to particular uses contemplated. It is intended that the scope of the invention be defined by the claims appended hereto.

We claim:

1. A method for reconfiguring an aircraft, the method comprising:
   attaching a pallet to a structure of the aircraft, the pallet comprising:
      a pallet-aircraft network connector configured to couple mission equipment to a data network of the aircraft;
      a pallet-aircraft environmental conditioning connector configured to couple the pallet to an environmental conditioning system of the aircraft;
      a pallet-equipment environmental conditioning connector configured to couple the mission equipment to the environmental conditioning system of the aircraft via the pallet;
      a pallet to pallet network connector configured to couple to another pallet to the data network of the aircraft via the pallet; and
      a pallet to pallet environmental conditioning connector configured to couple the another pallet to the environmental conditioning system of the aircraft via the pallet; and
   connecting at least one of:
      the mission equipment to the data network of the aircraft using the pallet-aircraft network connector;
      the pallet to the environmental conditioning system of the aircraft using the pallet-aircraft environmental conditioning connector; or
      the mission equipment to the environmental conditioning system of the aircraft using pallet-equipment environmental conditioning connector.

2. The method of claim 1, further including coupling another pallet to the data network of the aircraft by connecting the another pallet to the pallet using the pallet to pallet network connector.

3. The method of claim 1, further including coupling the another pallet to the environmental conditioning system of the aircraft by connecting the another pallet to the pallet using the pallet to pallet environmental conditioning connector.

4. The method of claim 1, further including coupling at least one of:
   a pallet power system of the pallet to an aircraft power system using an electric power connector of the pallet;
   the pallet power system to the mission equipment using a pallet power connector of the pallet;
   a pallet environmental conditioning system of the pallet to the environmental conditioning system of the aircraft using the pallet-aircraft environmental conditioning connector; and
   a pallet network system of the pallet to the data network of the aircraft using the pallet-aircraft network connector.

5. The method of claim 1, wherein the structure of the aircraft includes a first structure and a second structure, and wherein the attaching the pallet to the structure of the aircraft includes attaching the pallet to the first structure, and further comprising:
   while the aircraft is in service and after the pallet is attached to the first structure:
      disconnecting the pallet from the first structure; and
      removably connecting the pallet to the second structure, the second structure being distinct and separate from the first structure.

6. The method of claim 5, wherein the first structure includes one of a main cabin floor, an overhead of a main cabin, and an interior of a cargo bay, and wherein the second structure includes another of the main cabin floor, the overhead of the main cabin, and the interior of the cargo bay.

7. The method of claim 1, wherein the mission equipment includes a workstation, a seat, lighting, a speaker, a video display, or a combination thereof, and wherein the pallet further comprises a pallet-aircraft power connector, and further comprising connecting, using the pallet-aircraft power connector:
   the workstation to a power system of the aircraft, wherein the workstation is communicatively coupled to the pallet-aircraft network connector;
   the lighting to the power system via a switch, the lighting electrically connected to a switch and the switch electrically connected to the power system via the pallet-aircraft power connector;
   the speaker to an audio system of the aircraft, the speaker coupled to the seat;
   the video display to a video system of the aircraft, the video display coupled to the seat; or
   a combination thereof.

8. The method of claim 1, wherein the mission equipment includes a vent nozzle, a workstation, a seat, or a combination thereof, and further comprising:
   connecting the mission equipment to the environmental conditioning system; and
   receiving a heating liquid, a cooling liquid, or both from the environmental conditioning system via the pallet-aircraft environmental conditioning connector.

9. The method of claim 1, wherein the attaching the pallet to the structure of the aircraft the pallet includes, while the aircraft is in service:
   disconnecting the pallet from the structure;
   after disconnecting the pallet from the structure, at least one of:
      reconfiguring the mission equipment; or
      replacing the mission equipment; and
   removably connecting the pallet to one of the structure and another structure.

10. An aircraft comprising:
    an airframe;
    a data network positioned about the airframe, the data network including a first plurality of connection points;
    an environmental conditioning system positioned about the airframe, the environmental conditioning system including a second plurality of connection points; and
    a pallet configured to couple to mission equipment and removably attachable to a structure carried by the airframe, the pallet comprising:
       a pallet-aircraft network connector configured to couple the mission equipment to the data network;
       a pallet-aircraft environmental conditioning connector configured to couple the pallet to the environmental conditioning system;
       a pallet-equipment environmental conditioning connector configured to couple the mission equipment to the environmental conditioning system via the pallet;
       a pallet to pallet network connector configured to couple another pallet to the data network via the pallet; and
       a pallet to pallet environmental conditioning connector configured to couple the another pallet to the environmental conditioning system via the pallet.

11. The aircraft of claim 10, further comprising:
    an aircraft power system positioned about the airframe, the aircraft power system including a third plurality of connection points, wherein the pallet further comprises:
       a pallet power system comprising:
          at least one electric power connector configured to couple the pallet power system to the aircraft power system; and
          at least one pallet power connector configured to couple the pallet power system to mission equipment carried by the pallet.

12. The aircraft of claim 10, wherein the pallet includes one of a pallet power system, a pallet network system, and a pallet environmental conditioning system.

13. The aircraft of claim 10, wherein the mission equipment includes at least one of a workstation, a seat, a drop down oxygen mask, lighting, ventilation outlets, a speaker, a video display, or emergency equipment.

14. The aircraft of claim 10, further comprising:
    a seat, the seat coupled to the pallet; and
    an audio system positioned about the airframe, the audio system configured to:
       couple to the seat;
       electrically couple to an pallet-aircraft power connector;
       communicatively couple to the pallet-aircraft network connector; and
       receive audio content via the pallet-aircraft network connection from the data network.

15. The aircraft of claim 10, further comprising a pallet environmental conditioning system of the pallet, the pallet environmental conditioning system configured to couple to:
    the pallet-aircraft environmental conditioning connector, the pallet-aircraft environmental conditioning connector configured to couple the pallet environmental conditioning system to the environmental conditioning system; and
    the pallet-equipment environmental conditioning connector, the pallet-equipment environmental conditioning connector configured to couple the pallet environmental conditioning system to the mission equipment.

16. The aircraft of claim 10, further comprising a second pallet, the second pallet comprising a pallet to pallet connector, the pallet to pallet connector configured to couple the second pallet, via the pallet, to at least one of the data network, the environmental conditioning system, a power system of the aircraft, an audio system of the aircraft, or a video system of the aircraft.

17. The aircraft of claim 10, further comprising a second pallet, the second pallet comprising a pallet data network system, the pallet data network system configured to connect to the data network via another one of the first plurality of connection points.

18. The aircraft of claim 10, further comprising a second pallet, the second pallet comprising a pallet data network system, the pallet data network system configured to connect to the data network via the pallet to pallet network connector.

19. The aircraft of claim 10, wherein the pallet further comprises at least one of a mission console, a mission processing system, a seat, overhead lighting, ventilation, or a honeycombed composite material.

20. The aircraft of claim 10, wherein the pallet is further comprises a honeycombed composite material.

\* \* \* \* \*